US007900897B2

(12) United States Patent
Bonkowski

(10) Patent No.: US 7,900,897 B2
(45) Date of Patent: Mar. 8, 2011

(54) WORKPIECE CLAMPING DEVICE AND METHOD

(76) Inventor: Ritchie Bonkowski, Blaine, WA (US)

( * ) Notice: Subject to any disclaimer, the term of this patent is extended or adjusted under 35 U.S.C. 154(b) by 824 days.

(21) Appl. No.: 11/611,889

(22) Filed: Dec. 18, 2006

(65) Prior Publication Data

US 2007/0267798 A1 Nov. 22, 2007

Related U.S. Application Data

(60) Provisional application No. 60/752,496, filed on Dec. 22, 2005.

(51) Int. Cl.
*B23Q 3/02* (2006.01)
*B25B 5/08* (2006.01)

(52) U.S. Cl. ............................ 269/138; 269/47; 269/234

(58) Field of Classification Search .................. 269/138, 269/153, 234, 32, 43, 71, 261, 275, 47
See application file for complete search history.

(56) References Cited

U.S. PATENT DOCUMENTS 4,049,253 A 9/1977 Mandel
4,804,171 A 2/1989 Dornfeld
4,805,888 A 2/1989 Bishop
4,901,991 A 2/1990 Bonkowski
6,126,159 A * 10/2000 Dornfeld ....................... 269/138

* cited by examiner

*Primary Examiner* — Joseph J Hail, III
*Assistant Examiner* — Jamal Daniel
(74) *Attorney, Agent, or Firm* — Dwayne E. Rogge; Hughes Law Firm, PLLC

(57) ABSTRACT

A clamping device & method for down clamping against a workpiece by utilizing part features produced during a prior operation. The mechanics of this device allow it to open, close, raise and lower during its initialization and release. The device contains a built in block type jaw restraint to facilitate the customization of its clamping heads to suit the shape of the part feature it is to clamp down upon. This device is used within the part boundaries, thus facilitating higher quantity part batch sizes being presented to the limited travels of the machine tool used to process the parts. This invention is comprised of readily available hardware items along with two cost effective and simple to mass-produce components. The device can be actuated manually or with automatic actuation. The method described to prepare the project is unique to the function & usage of this invention.

18 Claims, 7 Drawing Sheets

SECTION 3 - 3

SECTION 8 - 8

SECTION 11 - 11

SECTION 10 - 10

WORKPIECE CLAMPING DEVICE AND METHOD

CROSS-REFERENCE TO RELATED APPLICATION

This application claims the benefit of the filing of U.S. Provisional Patent Application Ser. No. 60/752,496 entitled “Workpiece Clamping Device”, filed on Dec. 22, 2005, and the specification thereof is incorporated herein by reference.

FIELD OF THE INVENTION

This invention relates to adjustable workpiece clamps and other holding devices, actuated manually or actuated automatically and more specifically to metal devices for securing a workpiece to a tooling fixture and on the bed of a machine tool.

DESCRIPTION OF RELATED ART

Numerous forms and types of clamps have long been known in the art, including those, which rely upon such mechanisms as screw threads, wedges, cams, inclines and orbital action. All of the miniature variants of these clamping devices apply their clamping force in a direction not parallel to the centerline of the means of actuation. Most closely resembling my invention is seen within U.S. Pat. No. 6,126,159, but upon close study of this art it will be seen that this device is a spreading device that functions by use of a wedge. This device utilizes an accessory item called a clamping brace by which the device jaws can be immobilized in order to prepare the jaws for a specific usage. Once the jaws have been customized for usage, this accessory item must be removed in order for this device to function. Another device appearing like my invention is seen within U.S. Pat. No. 4,804,171, but upon close study of this art it will be seen that this device is also a wedge actuated spreading device with no provision to facilitate customization of the device jaws. Another device is seen within U.S. Pat. No. 4,901,991, but upon close study of this art it will be seen that this device is also a wedge actuated spreading device. Yet another device is seen within U.S. Pat. No. 4,805,888, but upon close study of this art it will be seen that this device operates on an eccentric cam and applies forces not parallel to the means of actuation. Yet another device is seen within U.S. Pat. No. 4,049,253, but upon close study of this art it will be seen that this device is a toe clamp that uses wedging principals and applies forces not parallel to its means of actuation.

The present invention relates to improvements in quick-action miniature clamping devices for securely holding work pieces to a tooling structure and/or to the machine tool to undergo further processing’s and machining. This invention leaves a common convention of applying forces not parallel with the means of actuation and accomplishes its clamping action parallel to the centerline of the means of actuation. By using a clamping motion parallel to the means of actuation, this invention requires less space to function. Advantageously, by consuming less space by which to clamp a part, allows for the invention to be utilized within smaller areas that hereto before were considered not accessible by any other clamping devices. Advantageously, this device opens, closes, raises and lowers by rotation of its screw thus making it easy to use. This invention will allow lesser-experienced tooling designers to design toolings that hereto before could only be visualized and designed by senior skill level tool designers. This invention provides the tool designer more options to choose from when attempting to select areas of a part, which can be efficiently clamped upon. Prior to this invention many areas of a part were not considered suitable to clamp upon for the second processing step. This invention will provide a more standardized means by which parts can be clamped for the second processing step.

BRIEF SUMMARY OF THE INVENTION & METHOD

Invention

The present invention departs from other clamping systems that spread, expand or push thru utilization of wedges, cams, inclines and orbital actuation. The present invention more closely approximates part clamping thru the use of a screw with a washer and nut strategy thus providing advantageous down clamping by utilizing the general principals of a cap screw with holding forces of the invention module equal to the tensile/break strength of the screw used to set in motion this invention. This clamping device lends itself to low-cost fabrication and to ready installation and rapid low profile clamping of work-pieces, which are to undergo a second machining or processing. This clamping device utilizes part features together with the methods claimed herein as is produced from a prior processing step. Implementing the usage of this invention upon a tooling structure and subsequently the usage of the invention as a clamping device does not entail high cost and user skill. In one preferred embodiment, each of the intended work pieces, prepared with the method claimed, are placed over locating pins or against raised abutments or over a combination of any of these mentioned part locators and simultaneously over several strategically placed, attached and customized clamping devices, all located on, within and attached to the tooling structure. All part features utilized to locate by or clamp upon should or can be processed to finish part dimensions. An actuator key is passed thru the part method passageway and then thru the centrally located passageway of the customized clamping device and down into the driving cavity of the screw. Then the actuator key is rotated, advancing the device onto the part and tooling structure, until moderately tightened. Then the actuator key is removed and this process is repeated for each part method passageway and each customized clamping device. Optionally, this clamping device may be actuated without a key if an automatic actuator is used. The screw assemblage within the clamping device may be used to attach to a coupling link that is upon the power shaft of an automatic actuator. The automatic actuator could be selected from a variety of different types to suit the user, e.g. hydraulic, pneumatic, electrical, rotary or even a combination of these actuation devices in a manner as described herein. Because the clamping device housing is attached to the tooling structure, this device may be actuated by forces originating from either above the tooling structure or from below the tooling structure. The parts are now ready for secondary machining or processing. As the customized heads clamp upon the finished part dimensions, simple and generally used part programming options are employed to direct the cutting tool movements around and clear of the clamping heads of the invention. Releasing the part, raising the clamping device above the part feature and retracting the clamping ledges can be accomplished by rotating an actuator key into the driving cavity of the screw and counter rotating the screw thus raising the center piece of the clamping device which is designed to raise the housing above the part and mechanically bring together the clamping ledges to allow for part removal OR by utilizing an automatic actuator to accomplish the same series of clamping and unclamping, raise and lower movements. To customize the ledges of the clamping device, tighten the clamping device down onto a plate and machine the desired shape upon the heads.

Method

Prerequisite to the ability to manually use the invention are several part characteristics either as they exist in the part design or as would be added to the part to provide a unique method to be used in conjunction with the present invention. First Method, for manual actuation of the clamping device with a key, the part specifications must allow a thru passageway to be machined or processed in the location of the part feature that is to be utilized for clamping onto and to be used for an actuator key to pass through. Second Method, at a location within this passageway of the desired part feature, a mill cut is to be performed whose sides are perpendicular to the means of actuation of the present invention and should/may equal a finished part dimension depth that will be performed during the second machining or processing operation. This milling cut is at two diametrically opposed places or can be up to 360 degrees round recess type shape. This recess cut for the second method can be performed utilizing a "key cutter" or "circular cutter" as will be illustrated herein at FIG. 8. Should an automatic actuator actuate this clamping device, only the Second Method stated herein would be required to facilitate usage of this invention.

BRIEF DESCRIPTION OF THE FIGURES

Although the aspects and features of this invention and method which are considered to be novel are expressed in the appended claims, further details as to preferred practices and as to further objects and characteristics thereof may be most readily comprehended through reference to the following detailed description when taken in connection with the accompanying drawings and are not to be construed as limiting the invention wherein.

FIG. 2 is a perspective view of a clamping device shown in the closed position; a cross-section line is shown on this illustration to provide for a clear understanding of exactly where the cross-section view on FIG. 3 has been derived from.

FIG. 7 is a perspective view of a project part; a cross-section line is shown on this illustration to provide for a clear understanding of exactly where the cross-section view on FIG. 8 has been derived from.

FIG. 9 is a perspective view of a project part nested into a tooling structure, optional automatic actuators are shown for actuation of a claming device; two cross-section lines are shown on this illustration to provide for a clear understanding of exactly where the cross-section view on FIG. 10 and also FIG. 11 have been derived from.

DETAILED DESCRIPTION OF THE PREFERRED EMBODIMENT

Figure 1:
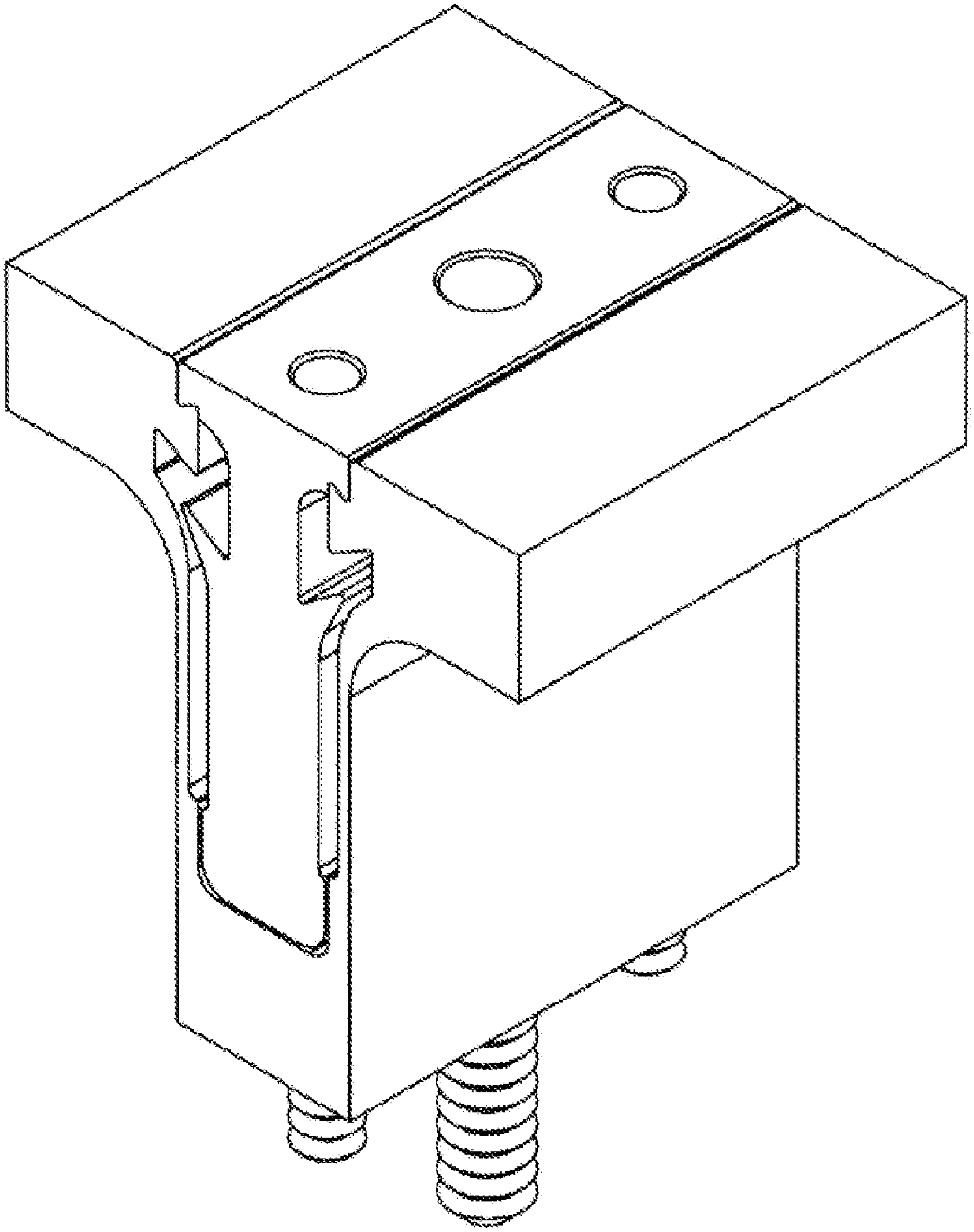
FIG. 1 is a perspective view of a clamping device shown in the closed position; some hardware items are obscured as they are within the solid shape.
Figure 2:
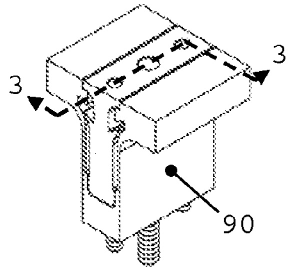
Figure 3:
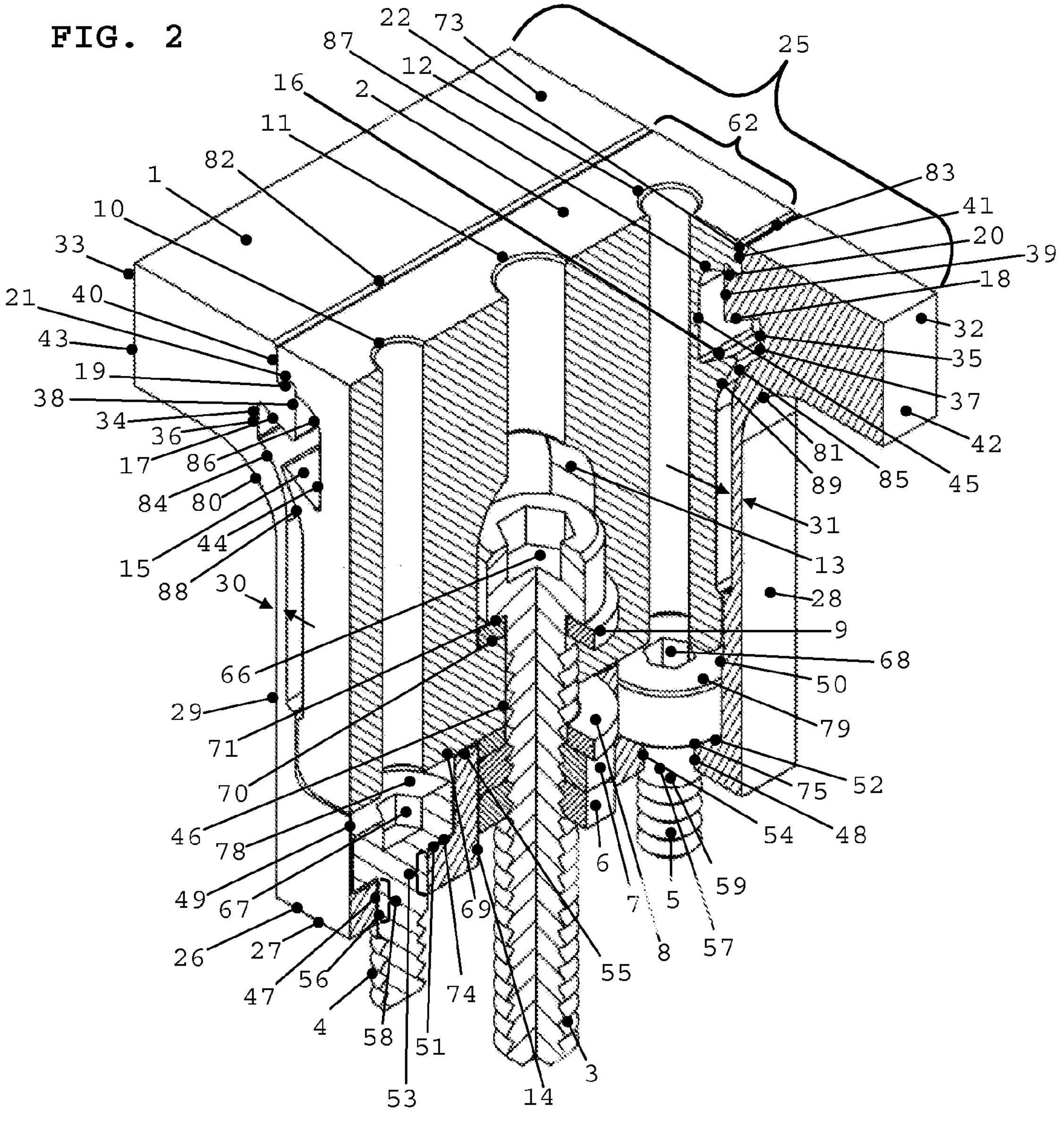
FIG. 3 is a perspective and cross-section view of a clamping device illustrating hardware items and other features.
Figure 4:
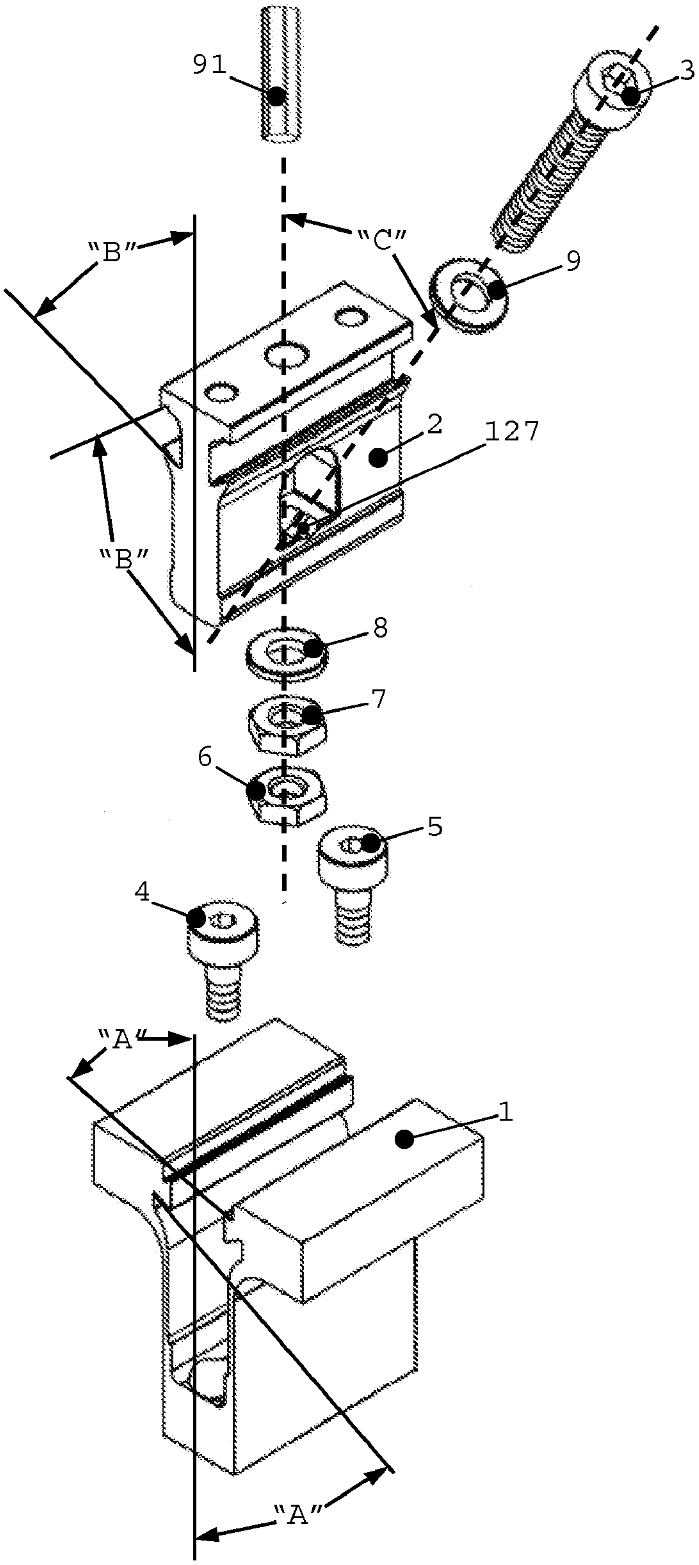
FIG. 4 is a perspective and blow out view of a clamping device. Certain angulated surfaces and an angulated passageway are illustrated.
Figure 5:
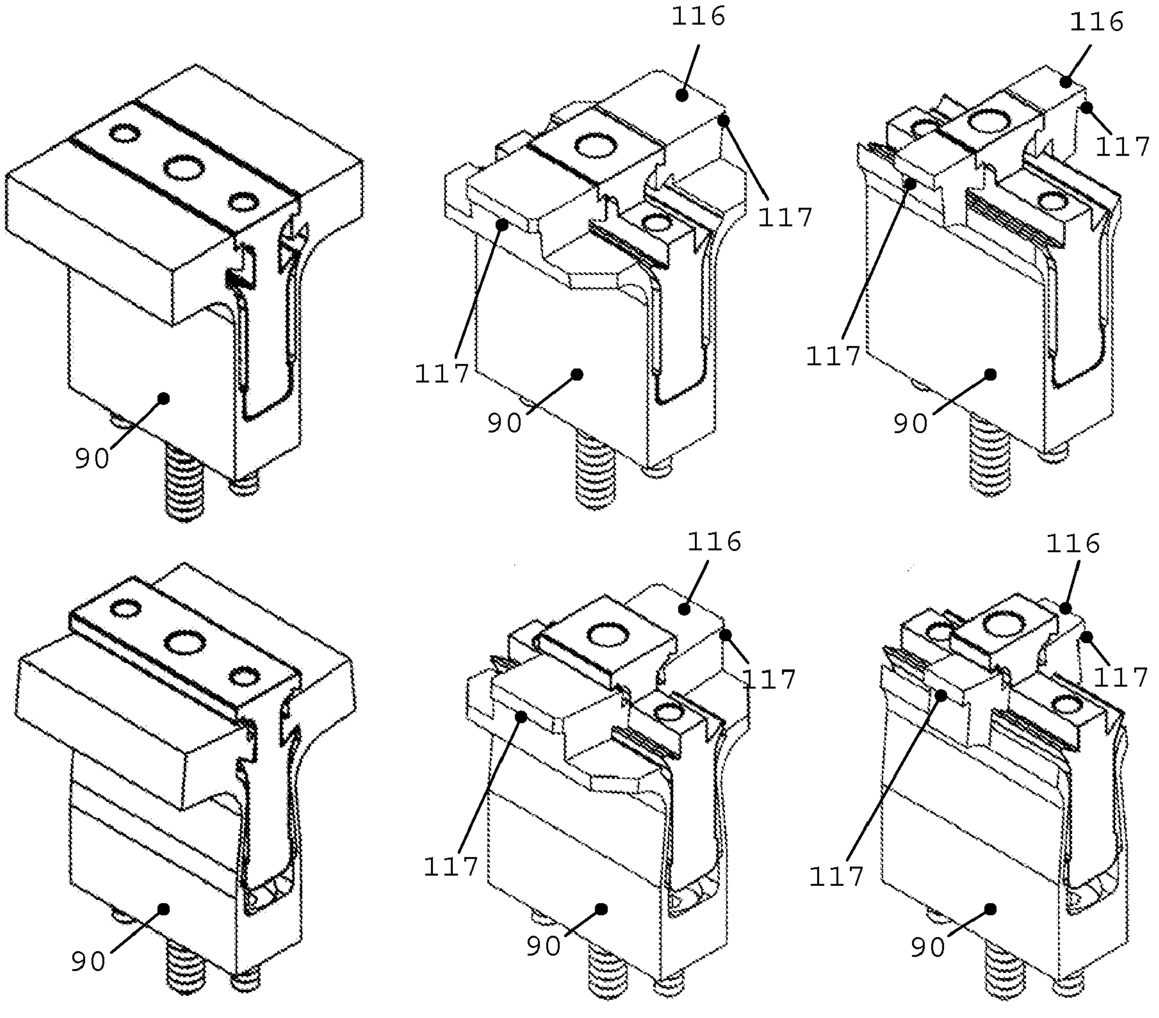
FIG. 5 is a perspective view illustrating several possible customizations of a clamping device. The clamping devices are shown customized and in both the open and closed positions.
Figure 6:
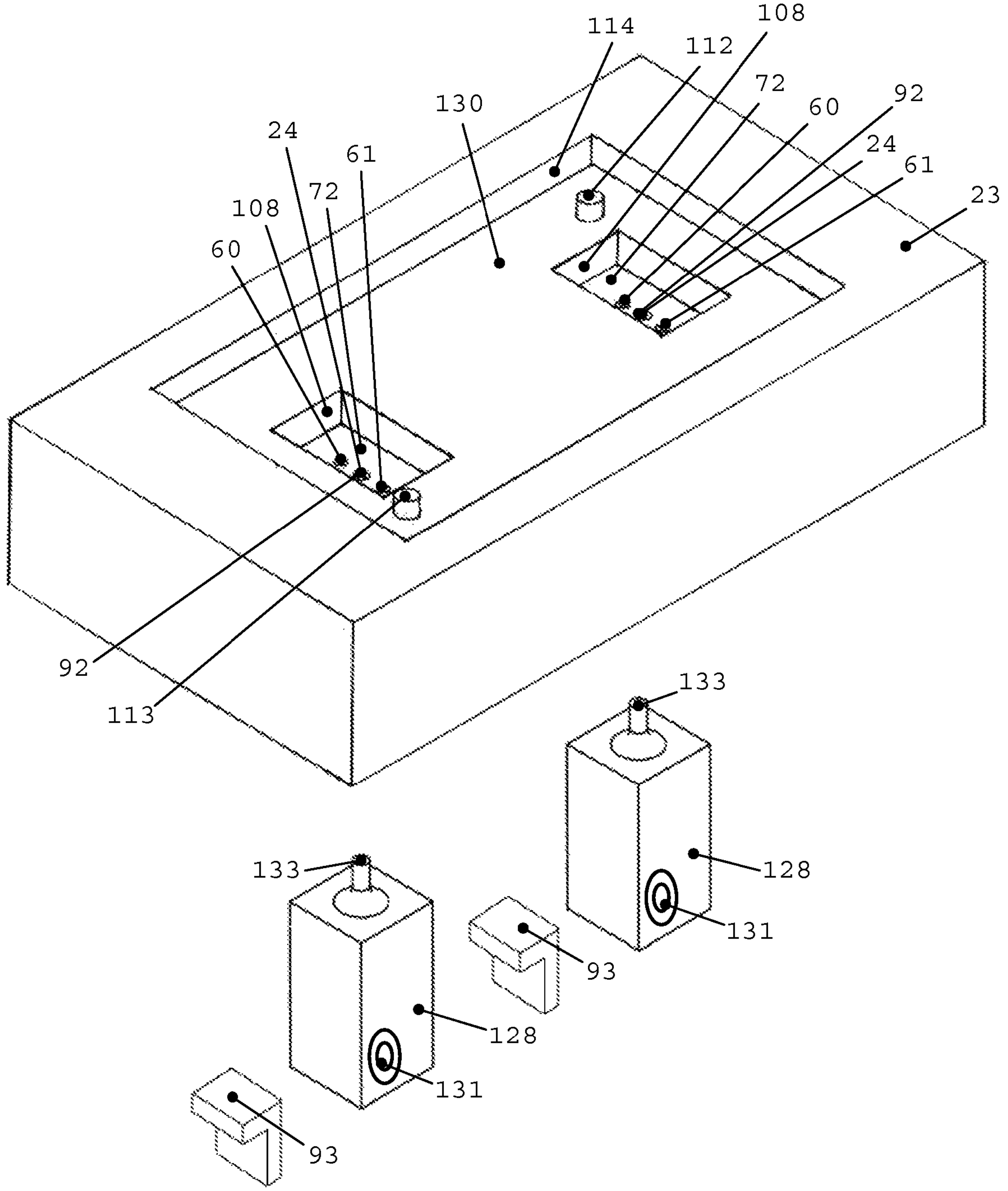
FIG. 6 is a perspective view illustrating a tooling structure, also illustrated are automatic actuators that may be used to actuate a clamping device.
Figure 7:
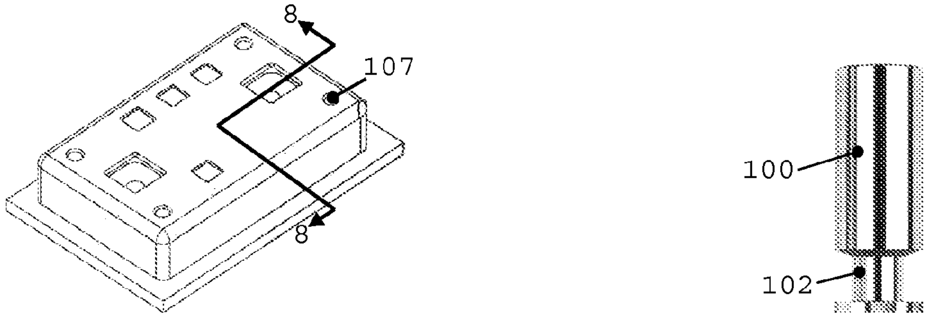
Figure 8:
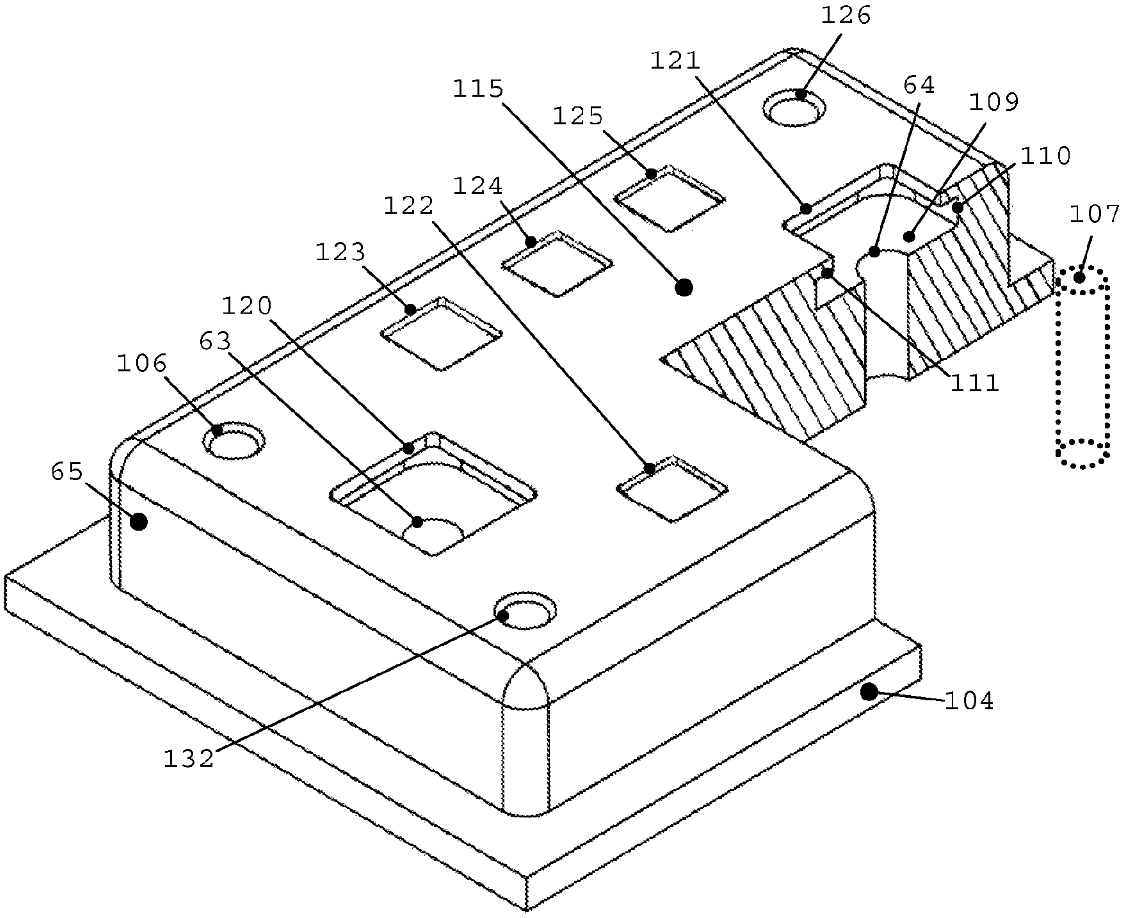
FIG. 8 is a perspective and cross-section view of a project part illustrating method features and also illustrating a means of providing a method.
Figure 9:
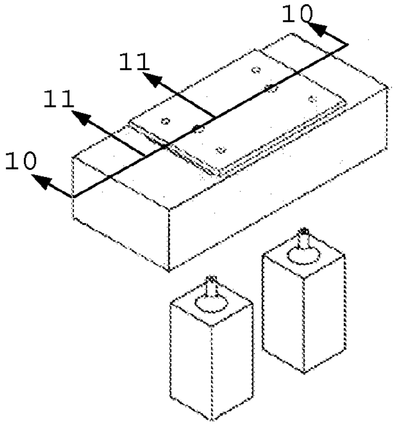
Figure 11:
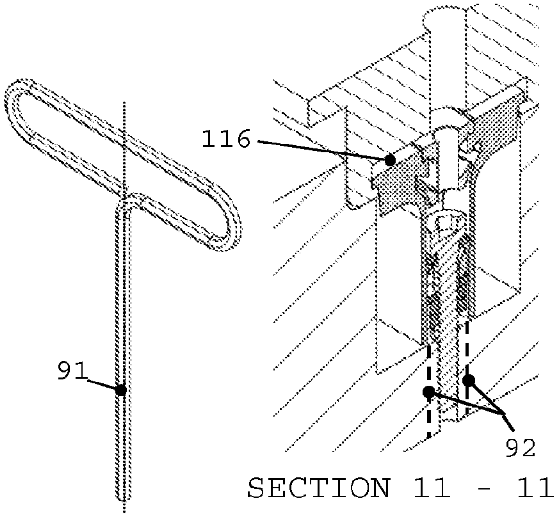
FIG. 11 is a perspective & cross-sectioned detail view of a portion of FIG. 10.
Figure 10:
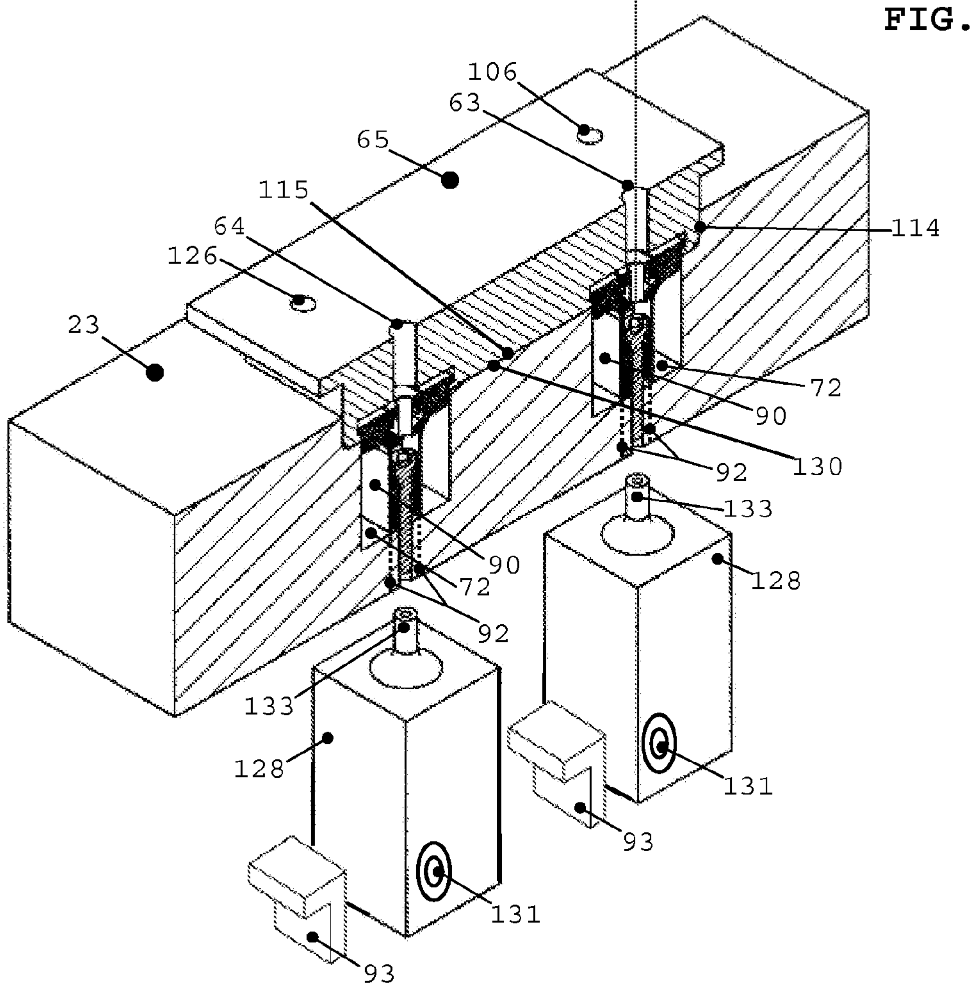
FIG. 10 is a perspective & cross-sectioned view of a project part illustrating method features; a tooling structure, two clamping devices, a manual actuator and a pair of optional automatic actuators.

Having reference to the drawings, wherein like reference characters designate identical or corresponding parts throughout the different views, there is shown a clamping device 90 comprised of a "U" shaped housing 1 made from rigid material having some resilient flexibility and a material whose shape may be mass produced by machining, molding, extruding, casting or stamping. The housing comprises a base 26 having a flat, horizontal undersurface 27 for mounting on a tooling structure 23 upon surface 72; housing surfaces 55 and undersurface 27 are co-planar. Projecting upwardly from opposite ends of base 26 and surface 55 are two substantially parallel shanks 28 & 29 being thicker at their lower end and at the inner face being reduced in thickness at 30 & 31 with the inner face surfaces continuing upwardly to transition with parallel profile surfaces 84 & 85 continue to a pair of substantially parallel, mirror image clearance channels 34 & 35. Said clearance channel vertical side surfaces 36 & 37 each continue upwardly until said vertical side surface of said clearance channel intersects the most upward and outwardly location of each angulated surface 17 & 18, each surface 17 & 18 then tapers inward and away from it at an angle "A" of approximately 60 degrees from the vertical to join vertical side surfaces 38 & 39 which now continue parallel and vertically to join a secondary pair of angulated surfaces 19 & 20 at their most inward and upper location, now transition outward and away from it at an angle "A" of approximately 60 degrees from the vertical and then continuing outwardly until intersecting vertical surfaces 40 & 41 and then continue parallel and vertically to parallel profile surfaces 82 & 83 which continue outwardly and transition into the planar surface 73. Parallel profile surfaces 82 & 83 provide a functional lead in surface for block 2. The outer surfaces of shanks 28 & 29 project upwardly and parallel from opposite ends of base surface 26 and continue to parallel profile surfaces 80 & 81 then continue outwardly and transition horizontally to the extents of side surfaces 42 & 43 then transition vertically to the top surface 73. The shanks 28 & 29 support a pair of customizable heads 32 & 33. Profile surfaces 80, 81, 84 & 85 provide structural support to customizable heads 32 & 33. Approximately mid-span distance of shanks 28 & 29 and passing thru perpendicular to co-planar surfaces 55 & 27 are passageways 47, 48 & 14. Passageway 14 is located approximately mid distance along the longitudinal length of surfaces 55 & 27 and passageways 47 & 48 are located approximately mid distance between passageways 14 and the furthest extents of surfaces 55 & 27 respectively.

There is shown a "T" shaped block 2 made from a material that is rigid and whose shape may be mass produced by machining, molding, extruding, casting or stamping and is comprised of parallel profile surfaces and dimensioned to nest between shanks 28 & 29 and to intimately nest angulated surfaces 15 & 16 against surfaces 17 & 18 at an angle "B" of approximately 60 degrees from the vertical. Angulated surfaces 21 & 22 are dimensioned to intimately nest with surfaces 19 & 20 at an angle "B" of approximately 60 degrees from the vertical. Surfaces 15 & 16 transition to vertical surfaces 44 & 45 which transition along profile surfaces 86 & 87 projecting upward and each outwardly to surfaces 21 & 22. Vertical surfaces 44, 45 are vertically dimensioned so as to allow either; a first pair of surfaces which is comprised of surfaces 15 & 16 to intimately nest with surfaces 17 & 18; OR a second pair of surfaces which is comprised of surfaces 21 & 22 to intimately nest with surfaces 19 & 20; but not dimensioned to allow the first and the second pair 2 surfaces to nest simultaneously. Vertical surfaces 44, 45 are dimensioned to place the entire vertical portion of surfaces 21 & 22 above surface 73 when surfaces 15 & 16 are intimately nested with surfaces 17 & 18. Surfaces 88 & 89 are dimensioned so as not to touch profile surfaces 84 & 85 when surfaces 21 & 22 intimately nest with surfaces 19 & 20. Surfaces 88 & 89 provide structural support to surfaces 15 & 16. The horizontal distance as measured perpendicular to surface 27 across the intersection of surfaces 15 & 88 horizontally across to the intersection of surfaces 16 & 89 is dimensioned to be greater than the horizontal distance as measured perpendicular to surface 27 across the intersection of surfaces 17 & 38 horizontally across to the intersection of surfaces 16 & 39 and same moment as surfaces 21 & 22 are intimately nesting with surfaces 19 & 20 with column 62 in place. The differential between these two dimensions allows material engagement to initiate intimate nesting of surfaces 15 against 17 and surfaces 16 against 18 when screw 3 is counter rotated away from tooling structure 23, also provided is a material engagement to make happen the interlocking of block 2 into housing 1, also provided during material engagement is an increase to the dimension between tooling structure surface 72 as measured from undersurface 27 as allowed by a comparative distance calculation between bolt 4 & 5 shoulder lengths 58 & 59 as compared to the passageway lengths of 53 & 54 to let rise clamping device 90. Relevant to clearances required between housing 1 and block 2 in the general area of the clearance channel surfaces 34 & 35 and more specifically the distance relationship between the intersecting surfaces 15 & 88 and horizontally across to the intersection of surfaces 16 & 89 are dimensioned less than the horizontal distance as measured perpendicular to surface 27 across the intersection of surfaces 34 & 17 and horizontally across to the intersection of surfaces 35 & 18 as required to facilitate an adequate area for block 2 to move as distance between surfaces 27 & 72 increases also as the distances reduce between surfaces 38 & 44 also between surfaces 39 & 45. Within block 2 is passageway 13 that is a profile surface traversing in a direction perpendicular to the longitudinal direction of the parallel profile surfaces comprising block 2. Surface 70 and surface 69 are coplanar. Passageway 13 provides residence for screw 3. Passageway 11 intersects passageway 13 in a perpendicular direction and provides access to screw 3 for an actuator key 91. Passageway 46 allows screw 3 to pass through to passageway 14. The center axis of passageway 127 intersects the centerline axis of passageway 46 at angle "C" of approximately 30 degrees from the vertical and both passageways 127 & 46 are of diameters that will accommodate screw 3. Passageways 11 & 46 are inline. Passageways 10 & 12 provide access to bolts 4 & 5 for an actuator key 91. Passageways 10, 12 & 46 are inline with locations of passageways 47, 48, 14 and tapped holes 60, 61 & 24.

There is shown a screw assemblage comprising of a screw 3 made from a material like alloy steel is passed thru an upper washer 9 that is made from a metallic material, then passed into passageway 127 at angle "C" then passed into passageway 46 then seated within passageway 13, onto surface 70 then passed thru lower washer 8 that is made from a metallic material. Upper nut 7 which is made from a metallic material is then rotated onto screw 3 until contact is made with lower washer 8 against surface 69, lower nut 6 which is made from a metallic material is then rotated onto screw 3 until contact is made with upper nut 7 at which time lower nut 6 is held stationary and upper nut 7 is counter-tightened against lower nut 6 to effectuate a wedge lock upon screw 3 which establishes a linear distance between washers 8 & 9 that is more than the linear distance between coplanar surfaces 69 & 70 to allow screw 3 to freely rotate in passageway 46.

There is shown shoulder bolts 4 & 5 that are made from a metallic material like alloy steel or stainless steel is passed through cooperating passageways 47 & 48. Counter bore type recesses 49 & 50 are dimensioned to allow shoulder bolts head surfaces 78 & 79 to be below surface 55 to a distance of (shoulder length 59 minus passageway wall length 54) and (shoulder length 58 minus passageway wall length 53) when bolt head undersurfaces 74 & 75 contact bottom of c-bore surfaces 51 & 52. Passageway diameters 47 & 48 are dimensioned larger than bolt shoulder diameter 56 & 57 by an amount approximating 3% of diameter 56 & 57 and linear length 53 & 54 are dimensioned shorter than bolt shoulder length 58 & 59 by an amount approximating 15% of diameter 56 & 57. These clearance calculations translate to a desirable free play fit characteristic between clamping device 90 to tooling structure 23 and part 65.

Housing 1 is positioned above tooling structure surface 72 with passageways 47 & 48 inline with tapped holes 60 & 61, shoulder bolts 4 & 5 are placed within passageways 47 & 48, an actuator key 91 is positioned into driving cavities 67 & 68 and shoulder bolts 4 & 5 are rotated into tapped holes 60 & 61 until tight against surface 72. Block 2 may be placed between shanks 28 & 29 and brought in place with screw 3 by placing an actuator key 91 thru passageway 11 into driving cavity 66 and rotating screw 3 into tapped hole 24. Vertical down clamping parallel with and guided by bolt shoulders 58 & 59 allow the clamping device and the customizable heads 32 & 33 to move toward tooling structure 23 by forces exerted by screw 3 when rotated into the tapped hole 24 and when the following events occur; surface 71 intimately contacts upper washer 9 onto surface 70 and surfaces 21 & 22 intimately nest with surfaces 18 & 19 establishing a inflexible column controlled dimension 62 as surface 69 intimately contacts surface 55. The clamping device 90 advances toward tooling structure 23 for a distance of (shoulder length 59 minus wall length 54) and (shoulder length 58 minus wall length 53) as undersurface 27 intimately contacts surface 72. The clamping device is now static. Dimension 25 is rigid and maximized and the clamping device is now attached to tooling structure 23. Vertical up release and clamp head 32 & 33 retraction of the clamping device 90 is accomplished as follows; insert actuator key 91 thru passageway 11 into cavity 66 of screw 3. Counter-rotating screw 3 away from tapped hole 24, exerts adequate force to cause the following events to occur; upper nut 7 intimately contacts lower washer 8 against surface 69 to vertically elevate block 2 until simultaneous intimate contact is made with surfaces 15 & 17 also 16 & 18. Continued rotation of actuator screw 3 away from tapped hole 24 lifts housing 1 away from surface 72 for a distance of (shoulder length 59 minus wall length 54) and (shoulder length 58 minus wall length 53) until c-bore bottom surfaces 51 & 52 intimately contact bolt undersurfaces 74 & 75 at which time housing 1 ceases to increase distance between surface 72 and undersurface 27. Continued counter rotation of screw 3 away from tapped hole 24 with housing 1 causes angulated surfaces 15 & 16 to move in a vertical direction away from surface 72 forcing angulated surfaces 17 & 18 to move in an inwardly direction along the inclines of surfaces 15 & 16 until surfaces 38 & 39 are forced to make contact with surfaces 44 & 45. At the conclusion of this event dimension 25 has been minimized, the clamping device is static in the vertical up position and the clamp retraction is complete.

There is also illustrated an optional method for clamping device actuation comprising of an underside mounted automatic actuator 128 attached to tooling structure 23 with cooperating brackets 93. Coupling link 133 passes through a cooperating passageway 92 and links to screw 3. Automatic actuation occurs as an energy source enters automatic actuator 128 thru power input 131. The automatic actuator 128 may be of hydraulic type or of pneumatic type or of an electric type or of a rotary screw type or of other types or a combination of those mentioned.

There is also illustrated several customizations of the clamping device 90 heads 42 & 43 with head shapes 116. Head shapes 116 are shown for reference only and many other shapes may be conceived and built, as a project may require. Customization of heads 42 &43 may be accomplished by firmly attaching clamping device 90 onto a tooling structure 23 or equivalent, using actuator key 91 thru passageways 10, 11 & 12 into driving cavities 66, 67 & 68 of screws 3, 4 & 5 to immobilize clamping device 90. Heads 42 & 43 may now be machined and customized to fit a part feature 120 & 121 as may be determined by a tooling person. Customization of additional clamping devices 90, for more and different feature shapes may be accomplished as per previous description. A trained machinist of ordinary skill can perform the customization of this clamping device.

There is also illustrated a part 65 together with preparation and method steps required prior to usage of clamping device 90. Part 65 is shown with all specified cuts 120, 121, 122, 123, 124 & 125, also holes 106, 126 & 132, all other surfaces including top surface 115 are cut to finish dimensions. Quite often this first process step utilizes a vise, other conventional clamping or fixturing, which leaves a remnant piece of material attached to the part called a carrier 104. In this example, part features 120 & 121 are selected to receive the method preparation to enable usage of clamping device 90. Method step 1, provide passageways 63 & 64 thru part of a cooperating diameter to accept actuator key 91. Method step 2, using a standard or customized cutter 100, with relief diameter 102, machine undercut surface 110 a minimum of two places 180 degrees apart to accommodate clamping device customized head shape 116. Surface 109 should be cut to a depth that will allow clamping device to function. The wall thickness between top surface 115 and undercut surface 111 may be to a finish dimension. Method is now complete.

There is also illustrated the general preparation steps for a tooling structure 23. A trained tooling person of ordinary skill may select the tooling structure material and sizes that meet requirements of part size and part density to be processed. Select part features from which to locate part 65 in the “X” & “Y” directions on tooling structure 23. Illustrated are pins 112 & 113 and/or a part accommodating nest shape 114. Part hole 106 may locate over pin 112 and phantomlike illustrated hole 107 may locate over pin 113, OR a combination of part accommodating nest shapes 114 and pins 112 & 113 may be used to locate part in tooling structure 23. Implement the selected part locating options above tooling structure surface 72. Part surface 115 is to intimately contact tooling structure surface 130 and at all areas where part features 120 & 121 intersect with part surface 115. Support by tooling structure surface 130 is required in these locations to effectuate direct toe clamping of part undersurfaces 111 against surface 130. Prepare a cooperating pocket cavity 108 to accept clamping device 90, drill and tap holes 24, 60 & 61. If an optional automatic actuator 128 is to be utilized, provide an accommodating passageway 92 in place of tapped holes 24 within tooling structure 23.

CNC programming may be required to develop a tool path layout and program to avoid cutter contact with the customized clamping head shapes 116 as these shapes will become visible as the second part processing is being performed. The clamping head shapes 116 may be viewed as “raised islands” to a CNC programming system and most CNC programming systems will program code to path cutters up, over, down and around the head shapes 116 of the clamping device 90. Head shape undersurface 117 should be contacting a finish part surface 111 as established by the Method cut. Surface 111 should be the same surface programmed to before the up, over, down and or around moves of the cutting tool.

While the preferred embodiment of the invention is directed toward clamping challenges within CNC tooling and machining, this device should also be viewed as a unique generic clamping module that is adaptable to many applications and its usage should not be considered limited to the examples presented herein. Variations and modifications of the present invention will be obvious to those skilled in the art and other embodiments may be devised without departing from the spirit of the invention and in the appended claims all such modifications and equivalents. The entire disclosures and all references, applications, patents and publications cited above are hereby incorporated by reference.

What is claimed is:

1. A workpiece clamping device for immobilizing a workpiece over a tooling structure, the clamping device comprising:

a) a substantially u-shaped housing having a surface defining a vertically aligned housing median hole in a median location of a housing base of the housing;

b) surfaces defining two vertically aligned, stepped housing outer holes whose axes are parallel to the axis of the surface defining the housing median hole, c) the housing operably configured to receive shoulder screws within the two housing outer stepped holes;

d) a pair of vertical shank members integrally formed with the housing at spaced apart locations on the housing base and aligned parallel to the axis of the surface defining the housing median hole;

e) each shank member comprising a flexible reduced thickness portion, f) a head extending from each shank being generally perpendicular to the associated shank, g) each head consisting of a material which is machinable;

h) each head comprising a surface defining a longitudinal housing channel comprising;

i) a housing channel lower angulated surface and a housing channel median angulated surface which are joined together by a joining surface;

j) a housing upper angulated surface;

k) a block (2)

l) the block further comprising a block base surface (55) and a block top surface (at 2);

m) the block (2) comprising a surface defining a block median hole (11) which is co-axial with the surface defining the housing median hole (14);

n) the block comprising a plurality of surfaces defining a plurality of block outer holes (10/12) which are co-axial with the surface defining the housing outer holes (47/48);

o) the block comprising a material which is machinable;

p) the block comprising a block lower obtuse angulated surface (88/89) traversing away from the axis of the block median hole and then transitioning to a block median angulated surface (15/16) traversing toward the axis of the block median hole;

q) wherein the block median angulated surface (15/16) is operatively configured such that as the block (2) is repositioned away from the housing base (26), and the block median angulated surface (15/16)engages the housing channel median angulated surface(17/18), the head (33) is repositioned in a vertical plane away from the housing base (26) and in a horizontal plane toward the block median hole(11);

r) wherein the block upper angulated surface (86/87) is operatively configured such that as the block (2) is repositioned vertically toward the housing base (26), and the block upper angulated surface (86/87) engages the housing channel upper angulated surface(19/20)), the head (33) is repositioned in a vertical plane toward from the housing base (26) and in a horizontal plane away from the block median hole(11);

s) a screw assemblage (3) comprising at least one screw; and a plurality of washers and a plurality of nuts t) the screw assemblage (3) being captivated within the surface defining the block median hole (11); and two a plurality of washers whose linear distance there between provides for free rotation of the screw.

2. The device of claim 1, operatively configured such that forces exerted during rotation of screw assemblage in a first direction cause angulated surfaces of block and angulated surfaces of said housing to simultaneously and intimately engage, raising clamping device vertically away from the tooling structure.

3. The device of claim 2, operatively configured such that forces exerted during rotation of screw assemblage in the first direction cause the housing to move a distance limited by the length of the shoulder screws at which time the movement of housing away from the tooling structure must stop.

4. The device of claim 3, operatively configured such that continued rotation of the screw assemblage in the first direction causes the block to traverse away from the housing and tooling structure and above the top surface of said housing after the completion of upward movement of housing.

5. The device of claim 4, operatively configured such that continued upward forces created during additional rotation of screw assemblage in the first direction applied to cooperating engagement surfaces of block and housing cause both shanks of housing to move toward each other until simultaneous contact is made with surfaces that joins lower angulated surface to said upper angulated surface of block at which time movement of housing shanks must stop.

6. The device of claim 5, wherein longitudinal channels in the housing comprise residences for angulated surfaces (88/15) of the block located below the upper surface of the block.

7. The device of claim 6, operatively configured such that forces exerted during rotation of screw assemblage result in the block upper angulated surfaces located within the cross member of the "T" area of block and the cooperating surfaces of said housing to simultaneously and intimately engage to cause the clamping device to move toward tooling, structure.

8. The device of claim 7, wherein the intimate engagement of the block onto the housing by the angulated surfaces provide an inflexible column to housing heads and simultaneously the block base surface intimately contacting the housing surface between shanks at which time clamping device is rendered inflexible.

9. The device of claim 8, wherein the inflexible housing heads may be customized.

10. The device of claim 9, operatively configured such that an actuator key may be passed through the surface defining the housing median hole to facilitate rotation of the screw assemblage.

11. The device of claim 9, further comprising an underside mounted automatic actuator connected to the screw assemblage.

12. The device of claim 9, further comprising an underside mounted hydraulic type actuator connected to the screw assemblage.

13. The device of claim 9, further comprising an underside mounted pneumatic type actuator connected to the screw assemblage.

14. The device of claim 9, further comprising an underside mounted electric type actuator.

15. The device of claim 9, further comprising an underside mounted rotary type actuator connected to the screw assemblage.

16. The device of claim 9, further comprising an underside mounted mechanical type actuator connected to the screw assemblage.

17. The device of claim 9, operatively configured to clamp and unclamp a workpiece by applying forces parallel to the axis of the screw assemblage, these forces facilitated by rotation of the screw assemblage which facilitates a series of movements that cause the clamping device to traverse away from a tooling plate as the screw assemblage is rotated in the first direction, toward a tooling plate as well as facilitating housing movements traversing toward and away from the screw assemblage as the screw assemblage is rotated in a second direction.

18. The device of claim 1, wherein the block has an approximate longitudinal dimension substantially equivalent to the longitudinal dimension of the housing.

* * * * *